United States Patent
Cisler et al.

(10) Patent No.: US 10,055,419 B2
(45) Date of Patent: Aug. 21, 2018

(54) USER INTERFACE FOR ACCESSING DOCUMENTS FROM A COMPUTING DEVICE

(75) Inventors: Pavel Cisler, Redwood City, CA (US); David A. Lyons, San Jose, CA (US); Loic E. Vandereyken, Palo Alto, CA (US); Lindsey E. Schramm, San Jose, CA (US); Yan Arrouye, Cupertino, CA (US); Ali Ozer, Redwood City, CA (US); Laurent Baumann, Cupertino, CA (US); Nathan Codding, Cupertino, CA (US); Patrick Coffman, Cupertino, CA (US); Todd Schomer, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/366,071

(22) Filed: Feb. 3, 2012

(65) Prior Publication Data
US 2013/0205251 A1 Aug. 8, 2013

(51) Int. Cl.
*G06F 17/30* (2006.01)

(52) U.S. Cl.
CPC .............. *G06F 17/30126* (2013.01)

(58) Field of Classification Search
CPC .......... G06F 21/6218; G06F 17/30165; G06F 21/10; G06F 21/62; G06F 8/61; G06F 21/12; G06F 9/4425; G06F 9/4443; G06F 3/0482; G06F 3/0486; G06F 17/30179; G06F 17/30115; G06F 2209/482; G06F 21/60; G06F 3/0643; G06F 3/0608; G06F 2221/2141; G06F 2221/2149; G06F 17/30017; G06F 17/3007; G06F 17/30368; G06F 11/2094; G06F 17/30126; H04L 63/10; H04L 67/34
USPC ................................ 715/717, 750, 810, 751
See application file for complete search history.

(56) References Cited

U.S. PATENT DOCUMENTS

| | | | | |
|---|---|---|---|---|
| 5,835,919 A | * | 11/1998 | Stern | G06F 3/0481 715/209 |
| 6,260,043 B1 | * | 7/2001 | Puri et al. | |
| 6,590,568 B1 | * | 7/2003 | Astala et al. | 345/173 |
| 7,062,532 B1 | * | 6/2006 | Sweat et al. | 709/205 |

(Continued)

FOREIGN PATENT DOCUMENTS

| | | | | |
|---|---|---|---|---|
| CN | 104081395 A | | 10/2014 | |
| EP | 1478158 A1 | * | 11/2004 | H04L 29/06 |

(Continued)

OTHER PUBLICATIONS

Jacob, iOS File Browser, Oct. 12, 2011, Jacob Online, http://jacobonline.wordpress.com/2011/10/12/ios-file-browser/.*

(Continued)

*Primary Examiner* — Jennifer To
*Assistant Examiner* — Terri Filosi
(74) *Attorney, Agent, or Firm* — Ronald Fernando

(57) ABSTRACT

An application-centric model is employed for the storage, searching and retrieval of documents. By entering a command directed to a particular application program, such as clicking on an icon for that program, a user interface panel displays documents stored on the computing device that are associated with that application. From the panel, the user can perform various actions with respect to the displayed documents.

39 Claims, 10 Drawing Sheets

(56) References Cited

U.S. PATENT DOCUMENTS

| | | | |
|---|---|---|---|
| 7,757,185 B2* | 7/2010 | Paquette et al. | 715/827 |
| 7,788,593 B1* | 8/2010 | Grechishkin et al. | 715/778 |
| 7,849,417 B2* | 12/2010 | Takahashi | 715/776 |
| 8,090,744 B1* | 1/2012 | Baird | 707/791 |
| 2001/0011308 A1* | 8/2001 | Clark et al. | 710/20 |
| 2001/0028363 A1* | 10/2001 | Nomoto et al. | 345/748 |
| 2003/0182139 A1* | 9/2003 | Harris | G06F 17/30017 705/1.1 |
| 2004/0095390 A1* | 5/2004 | Arning et al. | G06F 3/0486 715/769 |
| 2004/0249844 A1* | 12/2004 | Kotani | G06F 17/30265 |
| 2005/0149874 A1* | 7/2005 | Kokko et al. | 715/746 |
| 2006/0036568 A1* | 2/2006 | Moore et al. | G06F 17/30126 707/1 |
| 2006/0161853 A1* | 7/2006 | Chen et al. | 715/758 |
| 2006/0212814 A1* | 9/2006 | Campbell et al. | 715/733 |
| 2008/0059898 A1* | 3/2008 | Deggelmann et al. | 715/764 |
| 2008/0124093 A1* | 5/2008 | Kai | G03G 15/5087 399/9 |
| 2008/0229209 A1* | 9/2008 | Matsuzaki | 715/740 |
| 2009/0164908 A1* | 6/2009 | Diamond | 715/733 |
| 2009/0199122 A1* | 8/2009 | Deutsch et al. | 715/771 |
| 2010/0122184 A1* | 5/2010 | Vonog et al. | 715/753 |
| 2010/0131859 A1* | 5/2010 | Ferris et al. | 715/751 |
| 2011/0093844 A1* | 4/2011 | Yang et al. | 717/172 |
| 2011/0307817 A1* | 12/2011 | Douceur et al. | 715/769 |
| 2012/0063585 A1* | 3/2012 | Gravino | H04M 1/274516 379/218.01 |
| 2013/0041931 A1* | 2/2013 | Brand | 709/203 |
| 2014/0114575 A1* | 4/2014 | Alders | G01C 21/3655 701/538 |

FOREIGN PATENT DOCUMENTS

| | | |
|---|---|---|
| JP | 2004227170 A | 8/2004 |
| JP | 2005267559 A | 9/2005 |
| JP | 2005322135 A | 11/2005 |
| JP | 2009501397 A | 1/2009 |
| JP | 2011048835 A | 3/2011 |
| WO | WO-2011062689 A1 | 5/2011 |
| WO | WO-2013116604 A1 | 8/2013 |

OTHER PUBLICATIONS

"International Application Serial No. PCT/US2013/024289, International Search Report dated May 23, 2013", 3 pgs.

"International Application Serial No. PCT/US2013/024289, Written Opinion dated May 23, 2013", 5 pgs.

"iOS File Browser", Jacob Online, [Online.] [retrieved on May 10, 2013]. Retrieved from the Internet: <URL: http://jacobonline.wordpress.com/2011/10112/ios-file-browser/>, (Oct, 12, 2011), 3 pgs.

Landau, Ted, "File Sharing with an iPad: Ugh!", © The Mac Observer, [Online]. [retrieved on May 29, 2013]. Retrieved From Internet: <URL: http://www.macobserver.com/tmo/article/file_sharing_with_an_ipad_ugh>, (Apr. 6, 2010), 6 pgs.

Muchmore, Michael, et al., "Apple iCloud Review & Rating—Part 1", PCMag.com, [Online] [retrieved on May 29, 2013]. Retrieved from the Internet: <URL: http://www.pcmag.com/article2/0,2817,2394614,00.asp>, (Jan. 31, 2012), 5 pgs.

Muchmore, Michael, et al., "Apple iCloud Review & Rating—Part 2", PCMag.com, [Online] [retrieved on May 29, 2013]. Retrieved from the Internet: <URL: http://www.pcmag.com/article2/0,2817,2394614,00.asp>, (Jan. 31, 2012), 6 pgs.

"Australian Application Serial No. 2013214946, Amendment filed Jul. 8, 2014", 12 pgs.

"International Application Serial No. PCT/US2013/024289, International Preliminary Report on Patentability dated Aug. 14, 2014", 7 pgs.

"Korean Application Serial No. 10-2014-7024761, Amendment filed Sep. 3, 2014", w/English Claims, 61 pgs.

"Japanese Application Serial No. 2014-555735, Office Action dated Aug. 26, 2015", In English, 11 pgs.

"Korean Application Serial No. 10-2014-7024761, Office Action dated Aug. 19, 2015", w/ English Claims, 10 pgs.

"Australian Application Serial No. 2013214946, First Examiner Report dated Apr. 14, 2015", 6 pgs.

"Australian Application Serial No. 2013214946, Response filed Mar. 7, 2016 to Subsequent Examiners Report dated Nov. 18, 2015", 30 pgs.

"Australian Application Serial No. 2013214946, Subsequent Examiners Report dated Apr. 11, 2016", 4 pgs.

"Chinese Application Serial No. 201380007683.7, Voluntary Amendment", w/ English Claims, 13 pgs.

"Australian Application Serial No. 2013214946, Response filed Nov. 4, 2015 to First Examiner Report dated Apr. 14, 2015", 34 pgs.

"Australian Application Serial No. 2013214946, Subsequent Examiners Report dated Nov. 18, 2015", 4 pgs.

"Japanese Application Serial No. 2014-555735, Response filed Nov. 19, 2015 to Office Action dated Aug. 26, 2015", w/ English Claims, 19 pgs.

"Korean Application Serial No. 10-2014-7024761, Response filed Oct. 19, 2015 to Office Action dated Aug. 19, 2015", w/ English Translation, 31 pgs.

Jacob, "iOS File Browser", [Online] retrieved from the internet: <URL: http://jacobonline.wordpress.com/2011/10/12/ios-file-browser/> [retrieved from internet on Apr. 13, 2015], (Oct. 13, 2011).

Muchmore, M, et al., "Apple iCloud", [Online] retrieved from the internet<URL: http://www.pcmag.com/article2/0,2817,2394611,00.asp> [retrieved from internet on Apr. 13, 2015], (Jan. 31, 2012).

"Australian Application Serial No. 2013214946, Subsequent Examiners Report dated Mar. 9, 2016",3 pgs.

"Japanese Application Serial No. 2014-555735, Examiners Decision of Final Refusal dated Mar. 2, 2016", 5 pgs.

Office Action for Japanese Appl. No. 2016149632 dated Jul. 31, 2017 (English Translation).

\* cited by examiner

USER INTERFACE FOR ACCESSING DOCUMENTS FROM A COMPUTING DEVICE

FIELD OF THE INVENTION

The present disclosure is directed to the storage and retrieval of documents in a computing system, and more particularly to a user interface that provides a user with access to the documents.

BACKGROUND

Conventionally, a user's computing experiences were typically focused upon a particular device within a given environment. For instance, the user might interact with a desktop computer in the work environment, to store and access work-related documents, and might also have a home computer for storing and accessing personal documents. Alternatively, the user might employ a portable computer, e.g., a laptop computer, for use in both the work and home environments. In either case, the documents that the user created, edited, or otherwise interacted with, were typically stored on the user's computing device, or accessed via a network to which the computing device was connected.

When the user desired to access a document, the user might employ a user interface element, such as a browser, to view and locate all of the documents stored in the file system associated with the computing device. Alternatively, the user might employ a search tool to locate a document having a particular title, content or other attribute. The file system of the computing device might typically store a variety of documents associated with different types of application programs. For instance, the file system might contain text files associated with a word processing application, spreadsheet files, presentation files, photographs, video files, music files, and the like. Each of these different types of files has an associated format that can be interpreted and displayed by a given application program.

When the user desires to view the documents on the computer, for example via a browser, documents associated with all of the different application programs will generally be displayed. Likewise, when a search is conducted, documents associated with different application programs that meet the search criteria will be presented to the user. For example, a search for documents having the name "sheet" might return a word processing file entitled "Specifications Sheet," a spreadsheet file entitled "Fiscal Year Spreadsheet" and a graphics file entitled "Color Sheet." In other words, the storage of documents, and presentation of information to a user about the stored documents, comprehensively encompassed the entire file system associated with the computing device, without regard to the particular application programs with which the documents were affiliated.

More recently, the user's experience has not been limited to a single device for a given environment. Rather, the user might employ a number of different computing devices, such as a laptop or desktop computer, a tablet computer, a smart phone, and the like. At any given time, the user might view, and otherwise interact with, a particular document on any one of these different devices. To enable the user to access and interact with documents via any one of these different devices, the documents are stored both locally on the devices, and on a remote server that functions to synchronize the stored documents on all of the various computing devices. Thus, regardless of which computing device the user employs to access a document, the same version of the document will be present on each device. This type of computing experience is sometimes referred to as "cloud computing."

When looking for documents that are shared and synchronized among multiple devices, file-system based approaches to accessing documents, e.g., via a browser or search query, may not be conducive to an easy comprehension of the shared documents. In particular, the libraries of documents stored on the remote server for a given user are not viewable through a file-system based browser or search tool. Pursuant thereto, the present disclosure describes a user interface that facilitates easy understanding of which documents that are shared amongst multiple devices, and access to the documents.

SUMMARY

An application-centric model is employed for the storage, searching and retrieval of documents. By entering a command directed to a particular application program, such as clicking on an icon for that program, a user interface element, such as a window or panel, displays documents stored on the computing device that are associated with that application. For example, clicking on an icon for a spreadsheet program causes a panel to open that displays the spreadsheet documents stored on the computing device, for access by the user.

The foregoing features, as well as additional functions and advantages of the user interface, are described hereinafter with reference to exemplary embodiments depicted in the accompanying figures.

DETAILED DESCRIPTION

To facilitate an understanding of the concepts disclosed herein, they are described with reference to exemplary embodiments. In particular, a user interface is described in the context of its implementation in a so-called "cloud computing" environment, in which documents are stored on a remote server and can be accessed from a variety of different computing devices. The server functions to synchronize copies of the documents that are stored on each on each of a number of authorized devices. It will be appreciated, however, that the user interface described herein is not limited to this particular implementation. Rather, the principles that underlie the functionality of the user interface can be employed in a variety of different environments in which application-centric access to documents is beneficial.

Figure 1:
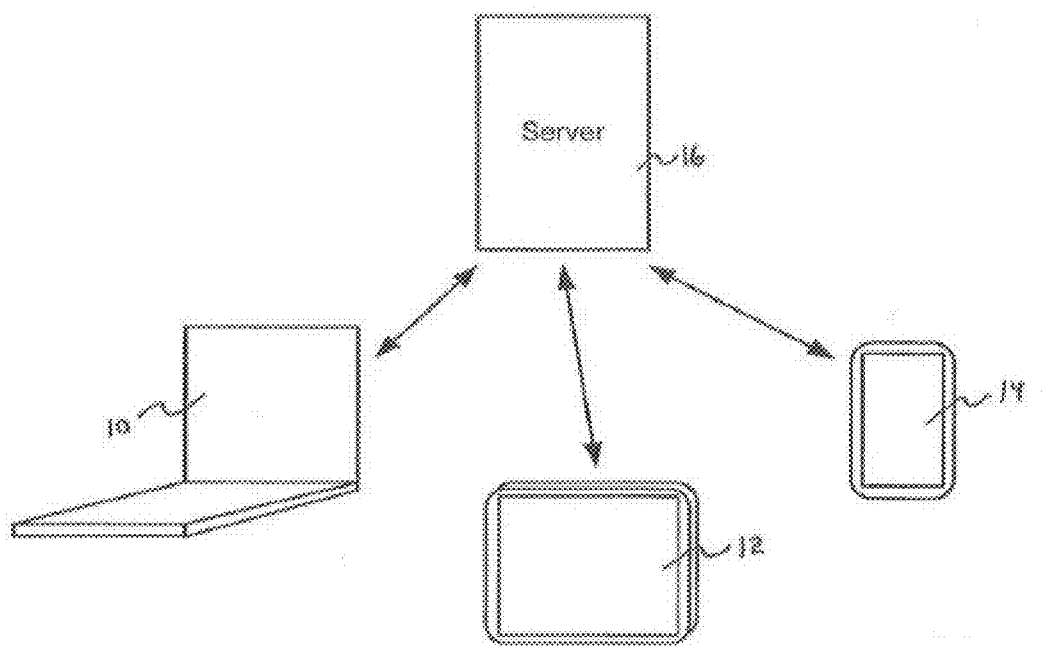
FIG. 1 is a schematic diagram of a cloud computing system with multiple user computing devices.

FIG. 1 illustrates a schematic view of a cloud computing environment in which the user interface of the present invention can be implemented. In the illustrated example, the user may have three different computing devices that are used to access, and otherwise interact with, documents, namely a laptop computer 10, a tablet computer 12 and a smart phone 14. The cloud computing environment enables the user to create or download a document on one of the computing devices, and then subsequently view, and interact with, the document on any of the other two devices. To implement this functionality, a copy of each document that is to be shared amongst the computing devices is stored on a server 16. In operation, whenever a document to be shared among the computing devices is created, downloaded or edited on one of the devices, the operating system of that device causes the document to be uploaded to the server 16. In response, the server performs a synchronization operation, to replicate a copy of the document on each of the other devices. Thus, after synchronization has occurred, a copy of the document is stored on each of the three computing devices 10, 12 and 14, as well as on the server 16. Although three computing devices are depicted in the illustrated example, it will be appreciated that any number of devices can be configured, and authorized, to share documents among one another. Likewise, more than one server can be employed to support the storage and synchronization of the shared documents.

Figure 2:
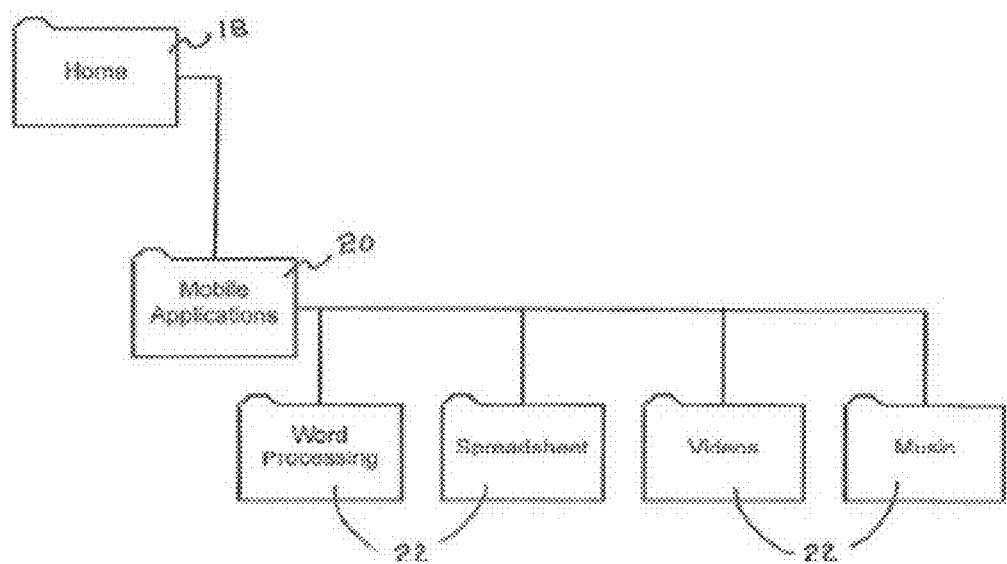
FIG. 2 is a schematic diagram of an exemplary folder hierarchy in a computing device for storing documents in an application-centric manner.

To facilitate the synchronization of documents among multiple computing devices, the documents are stored on each device, as well as on the server 16, in an application-centric manner. FIG. 2 illustrates an example of a folder hierarchy that may exist in the memory of each of the computing devices. Each device includes a home folder 18, which may function as the root directory for all files stored on the computing device. A mobile applications folder 20 is contained within the home folder 18. The mobile applications folder 20 may reside at the next layer of the folder hierarchy below the home folder, as shown in the figure, or there may be intervening layers of the hierarchy between the home folder and the mobile applications folder (not shown). The mobile applications folder contains a number of individual application folders 22 respectively associated with different application programs that are installed on the computing device. In the illustrated example, four application folders are respectively associated with a word processing application, a spreadsheet application, a video application program and a music organizer and playback program.

The folders 18-22 depicted in FIG. 2 represent logical file storage units that can be employed to group and/or associate related files and folders with one another. It will be appreciated that other forms of logical file storage units can be employed, e.g., directories, linked lists, memory partitions, etc., to provide such grouping and identification of related files.

When a new document is created on, or imported into, the computing device, it might be initially stored in a location where it is only locally accessible from that computing device. For instance, the document might be stored in the home folder 18. If the user desires to access that document from any of the other computing devices, the user can move the document from local memory storage into the mobile applications folder 20. When a document is placed in the mobile applications folder, the operating system of the computing device examines the document to determine the application program with which it is associated. For example, this association might be determined from an extension on the name of the file, or any other attribute of the file that identifies the format of the data. Upon determining the particular application program with which the document is associated, the operating system moves the document from the mobile applications folder 20 into the folder 22 associated with that application program. Thus, for example, if the document was created with a word processing program, it is moved into the word processing application folder.

Figure 3:
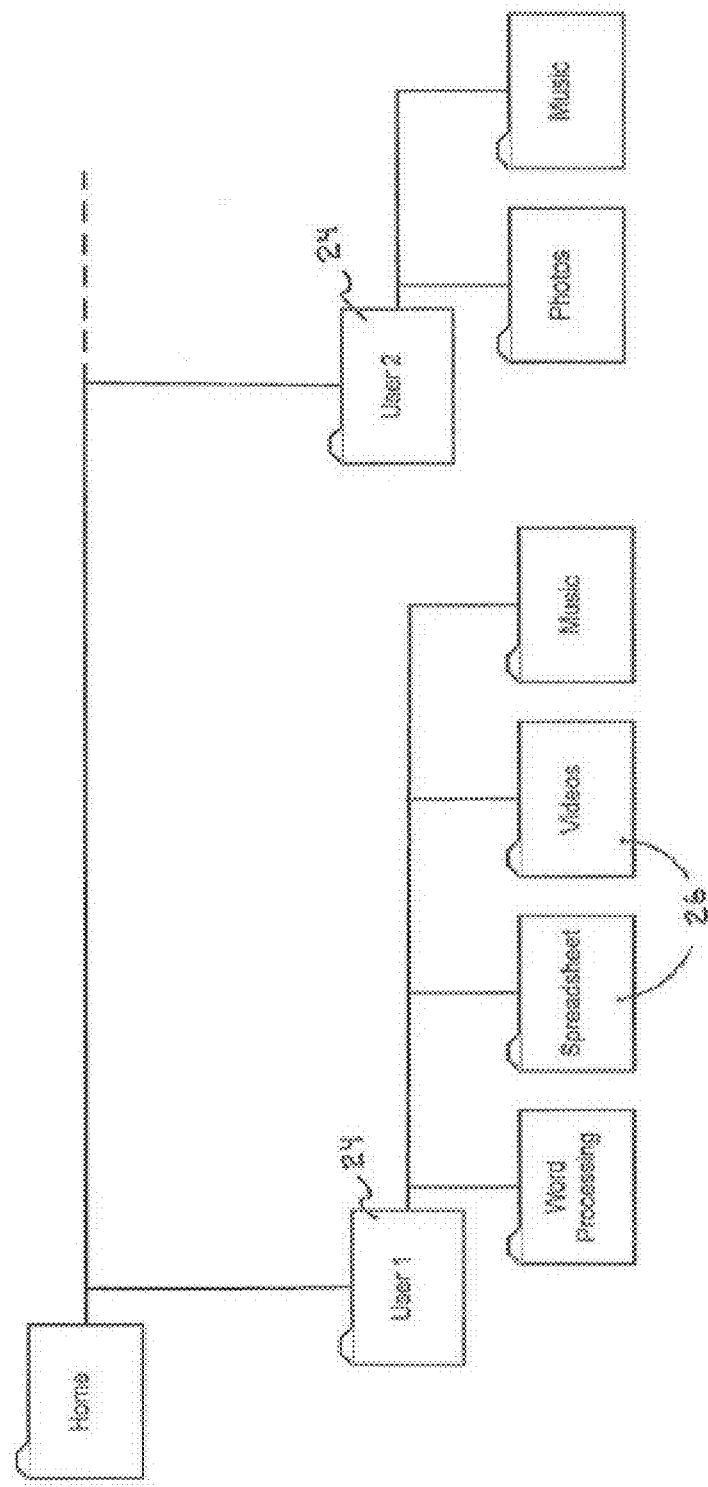
FIG. 3 is a schematic diagram of a folder hierarchy in a cloud server computer.

At the same time, the operating system uploads a copy of the document to the server 16. In response to receipt of the document, the server similarly examines the document to determine its associated application program, and places the document in an appropriate application folder. An exemplary folder hierarchy for the server 16 is illustrated in FIG. 3. Since the server provides synchronization services to a number of different users, its memory contains a separate folder 24 for each registered user. Within each user's folder, application folders 26 corresponding to that user's preferences are stored. Each user can designate the types of documents that are to be shared and synchronized among that user's computing devices. In the example of FIG. 3, it can be seen that User 1 has designated word processing, spreadsheet, movie and music documents to be shared amongst that user's computing devices, consistent with the example of FIG. 2. In contrast, User 2 has designated that only photos and music files are to be shared amongst that user's computing devices.

Once a document is uploaded from a computing device to the server 16, the server places that document in the appropriate application folder 26 of the user to whom the computing device is registered. In conjunction with doing so, the server also sends a copy of the document to each of the other computing devices associated with that user. The identification of all the computing devices associated with a particular user may be stored in the user's folder 24 on the server, or in a separate database on the server.

Further in this regard, the user may designate different subsets of documents to be synchronized on the user's different computing devices. For instance, the user may indicate that word processing documents are to be shared amongst the laptop computer and the tablet computer, whereas music files are only shared between the tablet computer and the smart phone. These designations can also be stored in the user's folder 24 on the server 16, or in a database, so that the server only sends copies of documents to be shared to the appropriate computing devices.

Figure 4:
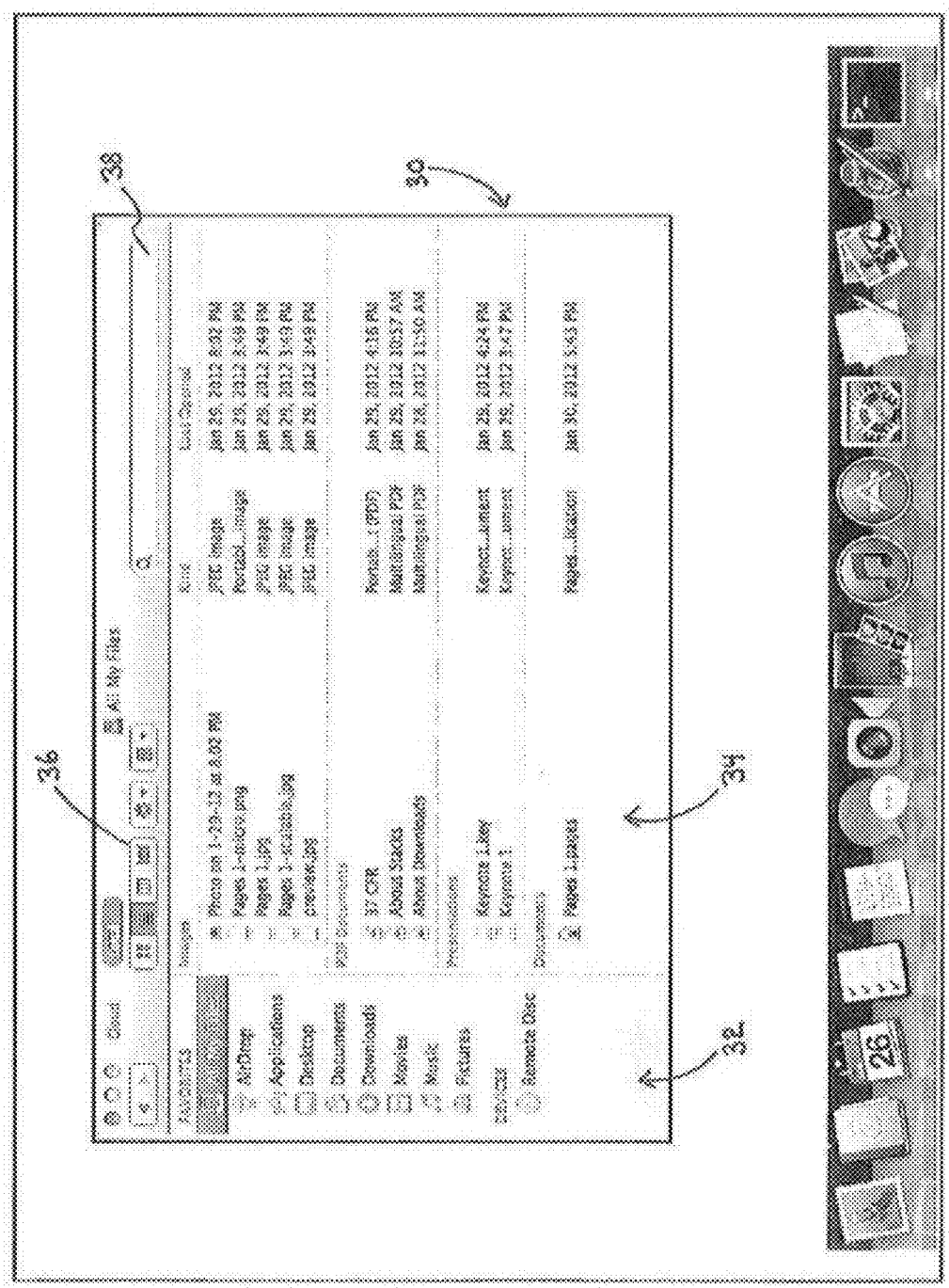
FIG. 4 is an image of a browser that provides a file-system based view of documents stored on a computing device.

FIG. 4 illustrates an example of a browser window 30 that may be employed as one type of user interface element to view documents that are locally stored on a computing device, and/or accessible via networked storage media. In this example, the browser includes a side bar menu 32 that enables the user to select a particular storage device, whose files are to be viewed, as well as a directory or subdirectory of the files. The window also contains a pane 34 illustrating the documents stored in the selected storage medium and/or directory. At the top of the window is a menu bar 36 that enables the user to select different viewing modes for the files. In the illustrated example, the files are presented in a list view. The browser window 30 also contains a search box 38 via which the user can enter a query to search for documents stored on memory accessible to the computing device. As can be seen, documents in a variety of different formats, respectively associated with different application programs, are displayed.

Figure 5:
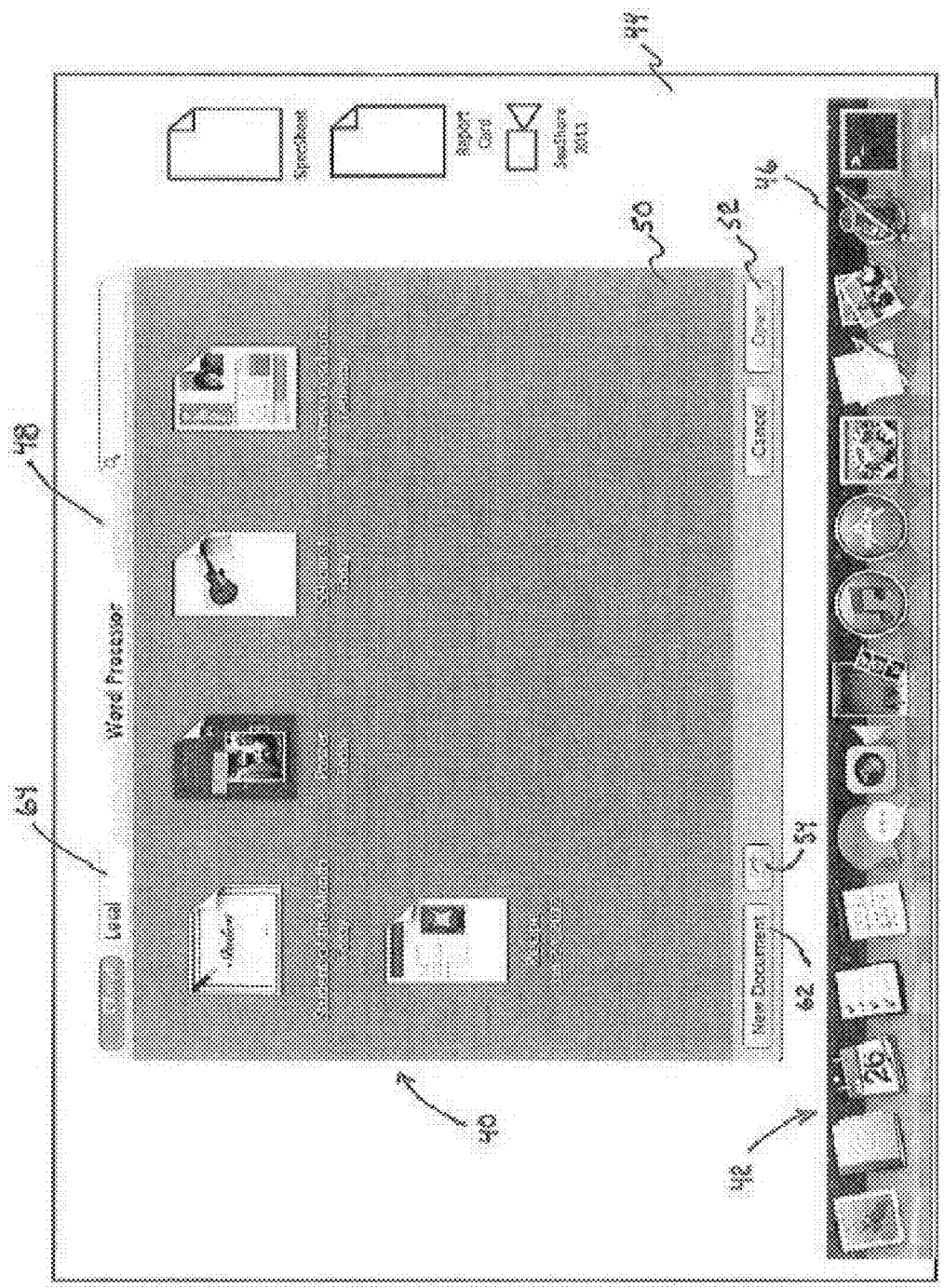
FIG. 5 is an image of a user interface panel that provides a view of documents stored in an application-centric manner.

FIG. 5 illustrates an alternative type of user interface element 40 that may be displayed to view and access documents when application-centric storage of the documents is employed, such as in a cloud computing environment. The user interface element comprises an application-based window or panel, hereinafter referred to as an application panel. Such a panel may be launched through a variety of different actions. For example, in the illustrated embodiment, a bar, or dock, 42 is displayed at the bottom of the viewing screen 44. This dock contains a number of icons that are respectively associated with different applications that have been installed on the computing device. By performing an action directed to one of these icons, the user can cause an application panel associated with that application to open. Such an action might be, for example, clicking on the icon while a cursor is positioned over it, or touching the icon on a computing device that includes a touch I/O display screen. In the illustrated example, the user has clicked on the icon 46 associated with a word processing application, which causes an application panel 40 associated with that application to open. Alternative actions for launching the application panel may be to pull down a "File" menu from an open window of the application, and select an "Open" command, or click on an icon for a document whose type is associated with the application.

The title bar 48 of the panel contains the name of the application program. Within the viewing pane 50 of the panel, only those documents that are associated with that application are displayed. Referring to the folder diagram of FIG. 2, therefore, the documents that are stored within the word processing application folder 22 are the ones that appear in the viewing pane of the application panel depicted in FIG. 5.

Figure 6:
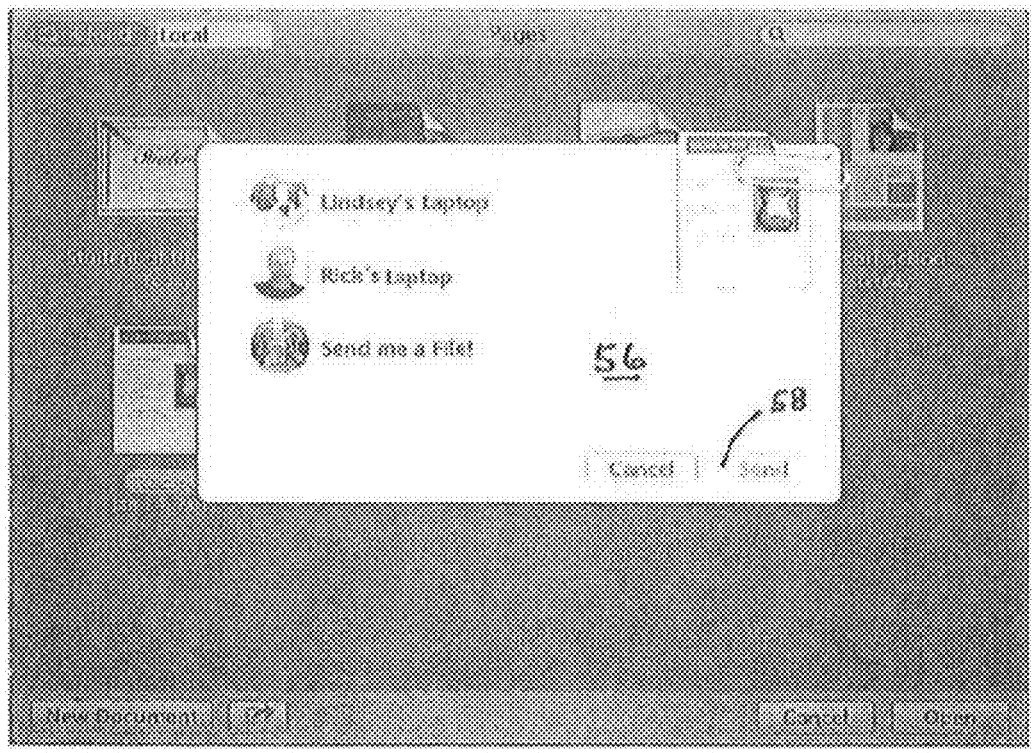
FIG. 6 is an image of a pop-up window for sharing documents with other users.

A number of different functions can be performed with respect to documents that are displayed in the application panel. A document can be opened within the associated application program, for example by double-clicking on the document, or by selecting the document and clicking an "Open" button 52. When one or more documents are selected, they can be shared with other users by clicking a "Forward" button 54. In one implementation, when the "Forward" button is activated, a pop up window 56, illustrated in FIG. 6, can migrate onto the application panel. From this window, the user can select one or more computing devices to which to send the selected document(s). Once the recipients have been selected, clicking on a "Send" button 58 causes the document(s) to be transmitted to the devices. Another approach to sharing the selected documents can be to create a new email message, with the documents as attachments, in response to activation of the "Forward" button.

Figure 7:
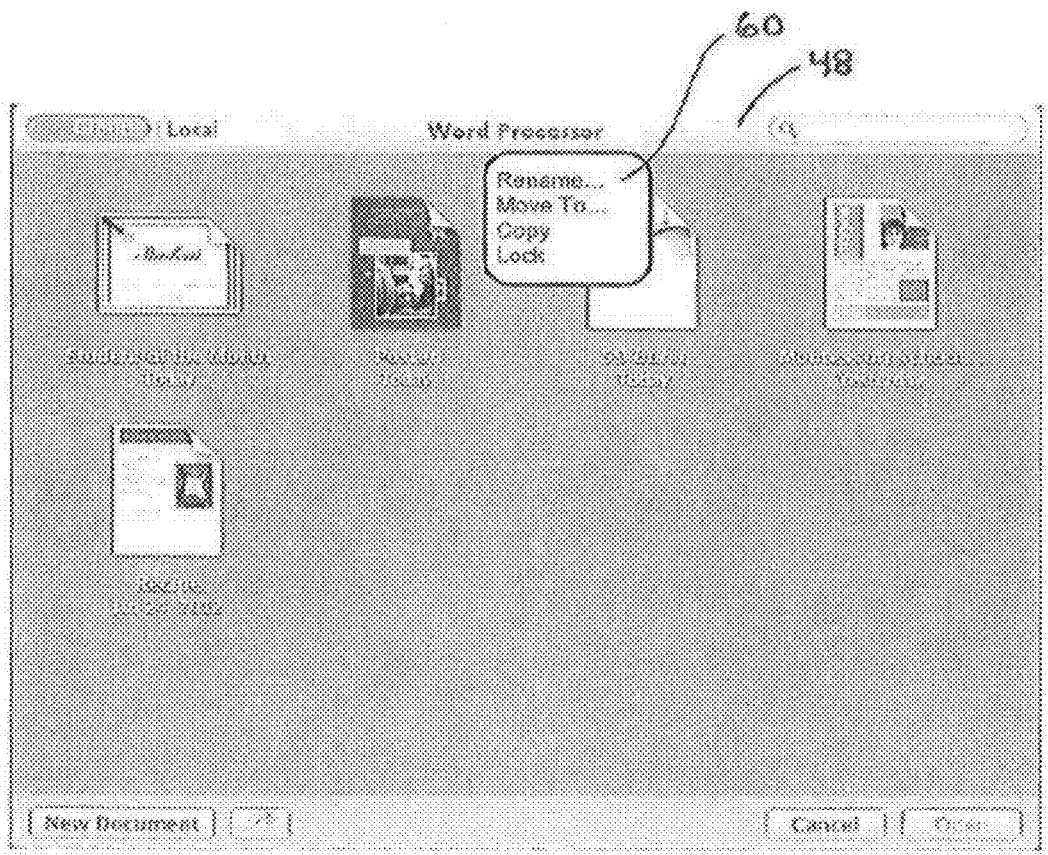
FIG. 7 is an illustration of a command menu that drops down from the title bar of an application panel.

Referring to FIG. 7, by clicking on the title bar 48 of the panel, a drop down menu 60 appears, to provide additional functions that can be performed on a selected document. These functions include the ability to rename a document, move it to another location, e.g., back to the desktop for local storage only, and duplicate, or copy, the document.

The application panel also provides the user with the ability to move a document from local storage to the server 16 (e.g., a synchronizing server), so that it is shared amongst multiple computing devices. This functionality can be implemented by dragging the document from the desktop or other locally accessible storage location, into the application panel. Since the panel is associated with a particular application program, the operating system of the computing device examines the document being dragged into the panel, to determine whether it is compatible with the given application. Thus, if the document was created with the same application, in this case a word processing application, the operating system permits it to be dropped onto the panel. In addition, the operating system moves the document into the appropriate application folder 22, to enable it to be replicated on other computing devices, via the server 16 (e.g., a cloud server).

Figure 8:
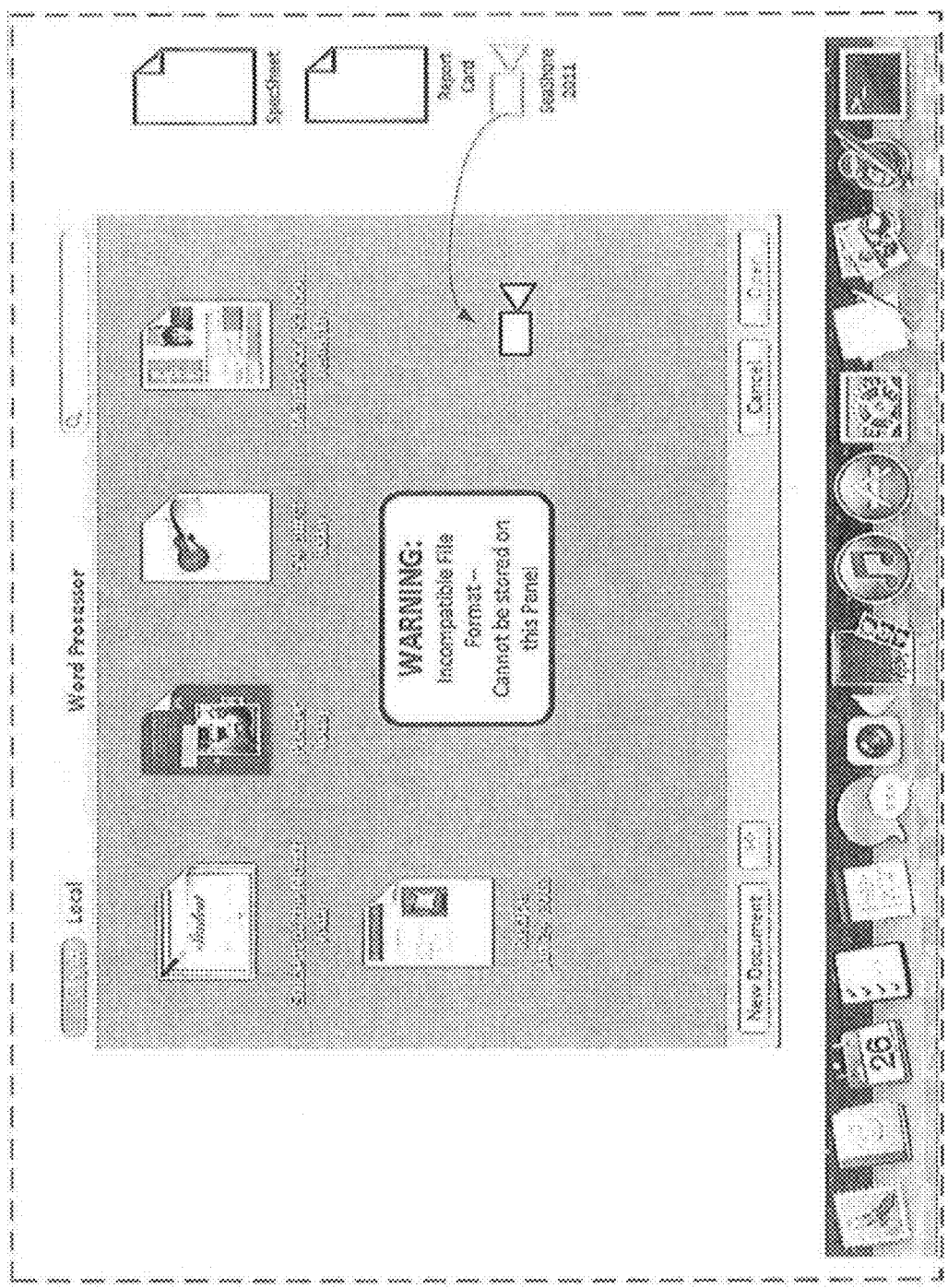
FIG. 8 is an illustration of a warning displayed when an incompatible document is dragged onto an application panel.

Conversely, as shown in FIG. 8, if the document is not compatible with the word processing application, e.g., it is a movie file, the operating system may cause the file to return to its original location, and/or may display a warning to the user that it cannot be placed on the panel.

The user may also drag a file that is created by a different application, but that is compatible with the application associated with the panel. For example, a text document may be in a first format that is associated with a text editing application program. If the text document is dropped onto the panel for the word processing application, the word processing application converts the document into its own format, and opens the document in the converted format.

Referring back to FIG. 5, it is also possible to open a new application document from the application panel 40, by clicking on a "New Document" button 62 shown at the bottom of the panel. In one embodiment, when such a command is entered to open a new document, another panel can be presented that displays various templates for formatting the new document to be created. Upon selecting one of the templates, a new document is opened in the format of that template.

When an application panel is open, it may be the case that a particular application document of interest to the user does not appear in the panel. For example, the user may not have designated that document to be shared among multiple devices via the cloud computing system, for instance by dragging or sending it to the mobile applications folder 20. If the user is not able to locate the desired document within the application panel, a "Local" button 64 can be actuated, to switch from the application panel view of FIG. 5 to the browser view of FIG. 4, and thereby provide a view of the files accessible via the local file system of the computing device. To apprise the user of the fact that a change is being made from an application-centric, cloud-based view of documents to a local file system-view of documents, the application panel 40 preferably has a different appearance from the browser 30. For example, a comparison of FIGS. 4 and 5 reveals that the side bar 32 in the browser 30 is not present in the application panel 50. In addition, the browser 30 has a different motif from the application panel.

In the examples of FIGS. 4 and 5, the documents are displayed in different viewing formats. Specifically, in the browser of FIG. 4, the documents are presented in a list view, whereas in the application panel of FIG. 5, the documents are presented in a thumbnail view. This change in viewing format reinforces the impression that a switch has been made between the sets of documents that are being viewed. In an alternative embodiment, it may be preferable to maintain a consistent viewing format when the switch is made from the application panel 50 to the browser 30, or vice versa. Thus, if the documents are presented with a thumbnail view in the application panel 50, upon actuating the Local button 64 to switch to the browser 30, the displayed files can be presented in the thumbnail view as well.

Another mechanism that can be employed, to notify the user of the switch, is to display an animation as the transition is made from one user interface element to the other. For example, the application panel 40 might appear as a page that is flipping over, with the browser 30 on the reverse side of the page.

In an embodiment, the behavior of the application panel is non-modal. In this embodiment, if other windows are open on the desktop, in addition to the application panel, the user can switch to any of the other open windows, and interact with them, without the need to close the application panel. Thus, for example, with reference to FIG. 5, the user could open the text document "Spec Sheet" and edit it while the application panel 50 remains open on the display.

Since the documents appearing in an application panel are synchronized among multiple computing devices, when a change is made to a document on one of the computing devices, that change can appear, in real time, on the other computing devices with which the document is shared. For example, the user may have a word processing document open on one computing device, and the application panel for the word processing application may be open on another one of the synchronized devices. If the viewing mode in the application panel is the thumbnail view, as depicted in FIG. 5, as changes are made to the document on the first computing device, those changes will appear in the thumbnail view on the application panel of the other computing device. The speed with which the change appears in the application panel will be dependent upon the rate at which the server 18 synchronizes the documents among the various computing devices. To alert a viewer of the second computing device that a change is being made to one of the documents, a suitable indicator, such as an arrow, can be displayed on, or adjacent, the thumbnail view of the document in the application panel.

In one embodiment, all of the documents associated with a given application may be stored in the application folder 22 for that application at the same hierarchical level. Thus, as illustrated in FIG. 5, each of the documents that are bound to the word processing application is individually displayed in the viewing pane 50. In some embodiments, it may be preferable to allow a subset of the documents to be grouped in a folder, or similar such logical file storage unit. In one embodiment, the ability to display documents within folders on the application panel can be made application specific. Thus, if a particular application does not permit hierarchical storage, the operating system does not allow folders to be created within the associated application folder, or be displayed in the application panel. Other applications may permit one hierarchical level of folders, such that multiple documents can be grouped within a folder, but one folder cannot be nested inside another folder. In other applications, nested folders may be permitted. When an application is installed on the computing device, the operating system is informed of the policy associated with that application program for folder creation, and enforces that policy in the application panels. Thus, with reference to the example of FIG. 5, if the word processing application does not permit folders, but the user drops one document on top of another document, in an attempt to create a folder, the operating system prohibits such action, and returns the dropped document to its original position.

In one implementation, once a user has launched an application panel, and opened a document from within the panel, the open document may replace the display of the application panel. If the user desires to open a second document of the same application, the application icon, e.g., the word processing icon 46, can again be actuated to cause the application panel to reappear. If a second document is opened from that panel, it likewise replaces the display of the open panel. In this embodiment, after the user has closed the last of the open documents, it may be preferable to cause the application panel to reappear, to apprise the user of the fact that the associated application is still running. In response, the user can actuate the "Cancel" button on the application panel, to thereby remove the application panel from the display and quit the application. Alternatively, the panel can be closed, but the application remains running until the user explicitly exits the application, e.g. via a command on a menu, or the like.

Figure 9:
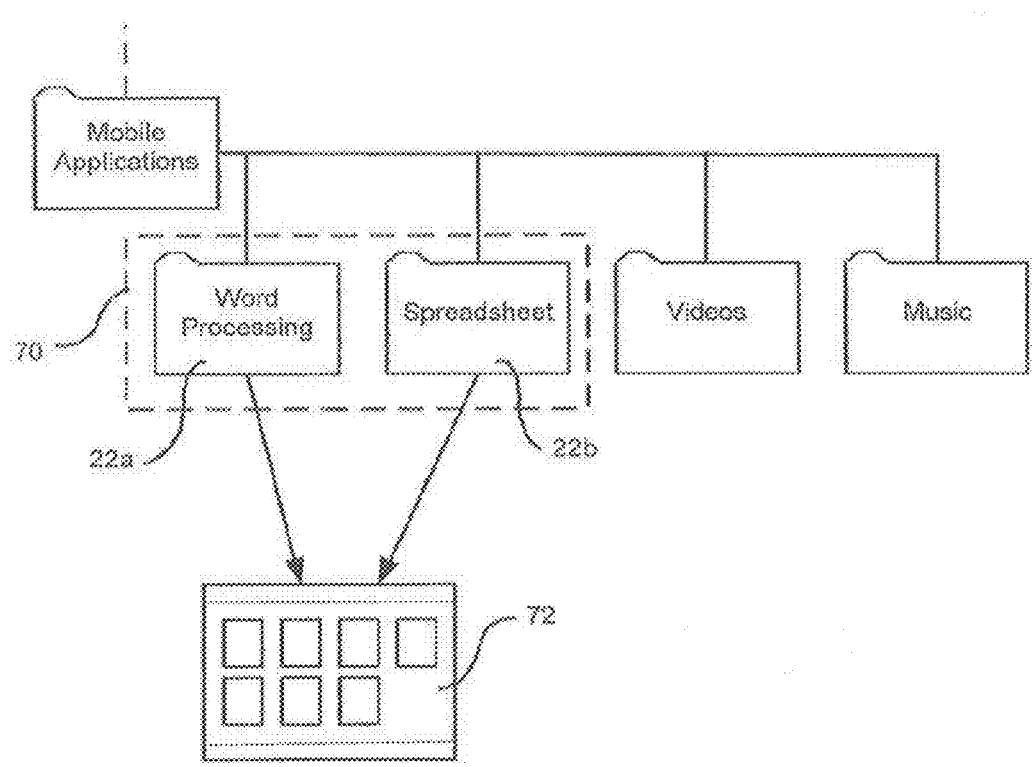
FIG. 9 is a schematic representation of a virtual folder.

In the previously described examples, each application program has an associated application folder 22, in which documents created by, or otherwise associated with, that program are stored. When the application panel is launched, only the documents stored in the associated application's folder 22 are displayed in the panel. In an alternate embodiment, it may be desirable to link two or more applications to one another. For example, if the word processing application and the spreadsheet application are created by the same developer, the formats of their documents may be compatible with one another. In that case, when a user is working on one type of document, it may be convenient to be able to access content from a related type of document. To accommodate such a situation, two or more application folders 22 can be linked to one another, to create a virtual folder. FIG. 9 illustrates an example of a virtual folder 70 that is based upon the word processing application folder 22a and the spreadsheet application folder 22b. When a user clicks on the application icon for the word processor, an open panel 72 is launched, and displays the documents contained in both the word processing application folder 22a and the spreadsheet application folder 22b. Similarly, if the user clicks on the icon for the spreadsheet program, an application panel appears, and the same two sets of documents are displayed in that panel.

Figure 10:
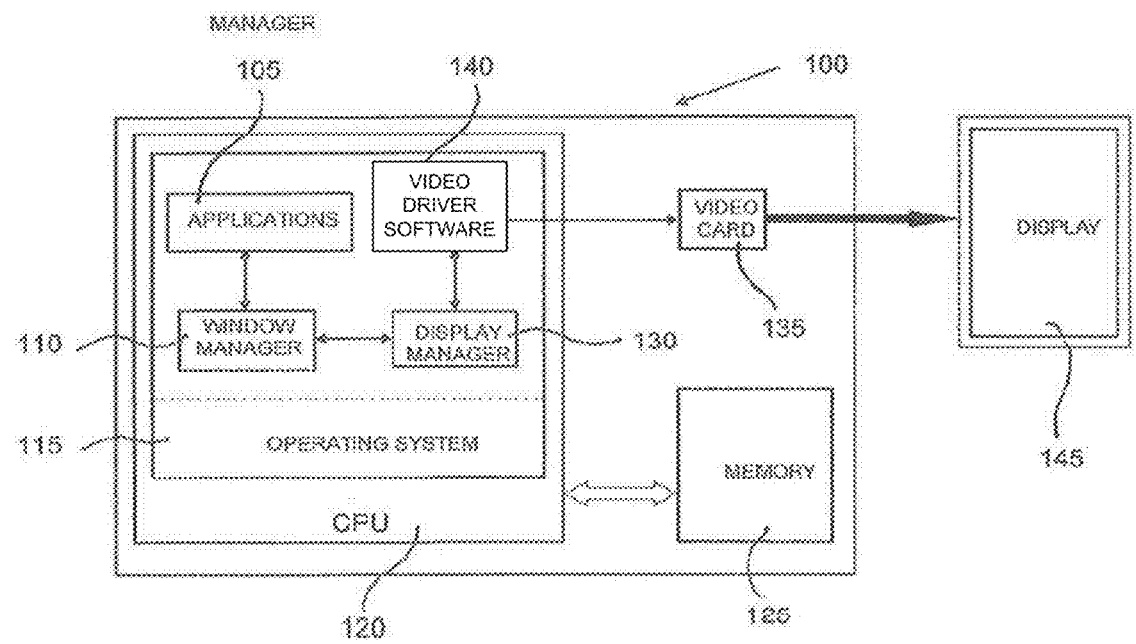
FIG. 10 is a block diagram of the components of an exemplary computing system.

FIG. 10 is a block diagram illustrating one example of hardware and software components of a computing device on which the user interface can be implemented. A computing device 100 can be any type of computer, such as, for example, a desktop computer, a workstation, a laptop computer, a tablet computer, a smart phone or personal digital assistant, or any other type of processor-based device that can support a GUI environment. Computer 100 includes a central processing unit (CPU) 120. CPU 120 can be any form of processor, such as, for example, a microprocessor. Computing device 100 also includes one or more forms of non-transitory, computer-readable memory 125. Memory 125 can include a suitable form of working memory, such as, for example, random access memory (RAM), or any other form of computer memory. Software components of computer 100 can be stored in non-volatile electronic storage media, such as, for example, a magnetic hard disk, an optical disk, and/or semiconductor memory, e.g., flash memory. From there, the software is loaded into the working memory for execution by CPU 120. Other data, including the documents associated with the application programs, can also be stored in the non-volatile memory media.

The system illustrated in FIG. 10 includes at least one display 145. Display 145 can be any type of display, such as, for example, a computer monitor, an LCD screen, a plasma display, a touch I/O screen, or any other form of display on which graphical and/or textual data can be presented to a user. Each display 145 is connected to, and controlled by, a video card 135 that operates in accordance with video driver software 140.

An operating system 115 running on CPU 120 can include a window manager 110. Operating system 115 can be any type of computer operating system that supports a GUI environment. Window manager 110 manages graphical windows, including the browser 30 and applications panel 40 described previously, as well as other graphical and/or textual control elements displayed on display 145. Window manager 110 can keep track of the location, size and status of each graphical window displayed on display 145. Window manager 110 can be any type of window manager or any other type of application that can manage graphical windows through which documents and any other form of graphical and/or textual information can be displayed to a user on a display device (e.g., display 145). Operating system 115 can also include a display manager 130 that provides communication between window manager 110 and the display devices (e.g., display 145) via the display devices' associated video driver software 140 and video card 135. Display manager 130 can be a software component that is either separate from or an integrated component of the operating system 115.

At least one software program, such as application program 105, generates information to be displayed on the display devices (e.g., display 145). Examples of such information include text, windows and other graphical objects, and control structures, such as, for example, menus and dialog boxes. This information is presented to display manager 130 through window manager 110 for eventual display to a user on display 145.

It will be appreciated by those of ordinary skill in the art that the foregoing concepts can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method comprising:
   at a computer system that includes one or more processors, a display, and non-transitory memory:
   displaying a first user interface element on the display, the first user interface element representing a logical file storage location for an application, wherein displaying the first user interface element includes displaying a plurality of file representations that correspond to a plurality of files stored in the logical file storage location;
   while displaying the first user interface element, detecting an input that corresponds to dropping a representation of a file onto the first user interface element; and
   in response to detecting the input that corresponds to dropping the representation of the file onto the first user interface element:
   in accordance with a determination that a file format of the file is not compatible with the application and responsive to the input, forgoing storage of content corresponding to the file in the logical file storage location associated with the application, and displaying a warning on the display that indicates that the file format of the file is not compatible with the application; and
   in accordance with a determination that the file format of the file is compatible with the application and responsive to the input, storing the content corresponding to the file in the logical file storage location associated with the application without displaying the warning on the display, and displaying the representation of the file on the display concurrently with displaying the plurality of file representations that correspond to the plurality of files that were stored in the logical file storage location prior to detecting the input.

2. The method of claim 1, including:
   in accordance with a determination that the file format of the file is compatible with the application, converting the compatible file format to a file format corresponding to the application prior to storing the content corresponding to the file in the logical file storage location associated with the application.

3. The method of claim 2, wherein the converting of the compatible file format to the file format corresponding to the application occurs in response to the representation of the file being dropped onto the first user interface element and prior to storing the content corresponding to the file in the logical file storage location.

4. The method of claim 1, further comprising in response to determining that the file format of the file is not the compatible file format, returning the content corresponding to the file to its original logical file storage location.

5. The method of claim 1, further comprising in accordance with the determination that the file format of the file is compatible with the application, automatically causing the content corresponding to the file to be stored on a remote server, for synchronization with other computing devices that include the application.

6. The method of claim 5, wherein the content corresponding to the file is stored on the remote server for synchronization with other computing devices associated with a same user account as the computing device.

7. The method of claim 1, further comprising:
   prior to displaying the first user interface element, displaying, on the display, a second user interface element that corresponds to a dock, and detecting a previous input directed toward the second user interface element; and
   wherein the displaying of the first user interface element is in response to the detection of the previous input directed toward the second user interface element.

8. The method of claim 7, wherein the previous input directed toward the second user interface element corresponds to a user action directed toward an icon contained within the dock, the icon being associated with the application.

9. The method of claim 1, wherein the warning includes text indicating that content corresponding to the file was not stored in the logical file storage location associated with the application because the file format of the file is not compatible with the application.

10. The method of claim 1, wherein the first user interface element corresponds to a folder that corresponds to the logical file storage location associated with the application.

11. The method of claim 1, wherein displaying the warning on the display that indicates that the file format of the file is not compatible with the application includes displaying the warning on the display that indicates that the file format of the file is not compatible with the application concurrently with displaying the plurality of file representations that correspond to the plurality of files that were stored in the logical file storage location prior to detecting the input.

12. The method of claim 1, further comprising:
in response to detecting the input that corresponds to dropping the representation of the file onto the first user interface element, displaying, on the display, a panel with one or more affordances that correspond to one or more computing devices, wherein selection of a respective affordance among the one or more affordances causes the file to be transmitted to a corresponding computing device.

13. The method of claim 1, wherein the plurality of files stored in the logical file storage location correspond to one or more file formats that are compatible with the application.

14. A device comprising:
a non-transitory memory;
a display device; and
one or more processors configured to perform operations comprising:
displaying a first user interface element on the display device, the first user interface element representing a logical file storage location for an application, wherein displaying the first user interface element includes displaying a plurality of file representations that correspond to a plurality of files stored in the logical file storage location;
while displaying the first user interface element, detecting an input that corresponds to dropping a representation of a file onto the first user interface element; and
in response to detecting the input that corresponds to dropping the representation of the file onto the first user interface element:
in accordance with a determination that a file format of the file is not compatible with the application and responsive to the input, forgoing storage of content corresponding to the file in the logical file storage location associated with the application, and displaying a warning on the display device that indicates that the file format of the file is not compatible with the application; and
in accordance with a determination that the file format of the file is compatible with the application and responsive to the input, storing the content corresponding to the file in the logical file storage location associated with the application without displaying the warning on the display device, and displaying the representation of the file on the display device concurrently with displaying the plurality of file representations that correspond to the plurality of files that were stored in the logical file storage location prior to detecting the input.

15. The device of claim 14, wherein the operations further comprise:
in accordance with a determination that the file format of the file is compatible with the application, converting the file format of the file to a file format corresponding to the application prior to storing content corresponding to the file in the logical file storage location associated with the application.

16. The device of claim 15, wherein the converting of the file format of the file to the file format corresponding to the application occurs in response to the representation of the file being dropped onto the first user interface element and prior to storing the content corresponding to the file in the logical file storage location.

17. The device of claim 14, wherein the operations further comprise: in response to determining that the file format of the file is not the compatible file format, returning the content corresponding to the file to its original logical file storage location.

18. The device of claim 14, wherein the operations further comprise:
in accordance with the determination that the file format of the file is compatible with the application, automatically causing the content corresponding to the file to be stored on a remote server, for synchronization with other computing devices that include the application.

19. The device of claim 18, wherein the content corresponding to the file is stored on the remote server for synchronization with other computing devices associated with a same user account as the computing device.

20. The device of claim 14, wherein the operations further comprise:
prior to displaying the first user interface element, displaying, on the display, a second user interface element that corresponds to a dock, and detecting a previous input directed toward the second user interface element; and
wherein the displaying of the first user interface element is in response to the detection of the previous input directed toward the second user interface element.

21. The device of claim 20, wherein the previous input directed toward the second user interface element corresponds to a user action directed toward an icon contained within the dock, the icon being associated with the application.

22. The device of claim 14, wherein the warning includes text indicating that content corresponding to the file was not stored in the logical file storage location associated with the application because the file format of the file is not compatible with the application.

23. The device of claim 14, wherein the first user interface element corresponds to a folder that corresponds to the logical file storage location associated with the application.

24. The device of claim 14, wherein displaying the warning on the display that indicates that the file format of the file is not compatible with the application includes displaying the warning on the display that indicates that the file format of the file is not compatible with the application concurrently with displaying the plurality of file representations that correspond to the plurality of files that were stored in the logical file storage location prior to detecting the input.

25. The device of claim 14, wherein the operations further comprises:
in response to detecting the input that corresponds to dropping the representation of the file onto the first user interface element, displaying, on the display, a panel with one or more affordances that correspond to one or more computing devices, wherein selection of a respective affordance among the one or more affordances causes the file to be transmitted to a corresponding computing device.

26. The device of claim 14, wherein the plurality of files stored in the logical file storage location correspond to one or more file formats that are compatible with the application.

27. A non-transitory computer-readable medium containing program instructions that, when executed by a processor of a device with a display, cause the device to perform operations comprising:
  displaying a first user interface element on the display, the first user interface element representing a logical file storage location for an application, wherein displaying the first user interface element includes displaying a plurality of file representations that correspond to a plurality of files stored in the logical file storage location;
  while displaying the first user interface element, detecting an input that corresponds to dropping a representation of a file onto the first user interface element; and
  in response to detecting the input that corresponds to dropping the representation of the file onto the first user interface element:
    in accordance with a determination that a file format of the file is not compatible with the application and responsive to the input, forgoing storage of content corresponding to the file in the logical file storage location associated with the application, and displaying a warning on the display that indicates that the file format of the file is not compatible with the application, and
    in accordance with a determination that the file format of the file is compatible with the application and responsive to the input, storing the content corresponding to the file in the logical file storage location associated with the application without displaying the warning on the display, and displaying the representation of the file on the display concurrently with displaying the plurality of file representations that correspond to the plurality of files that were stored in the logical file storage location prior to detecting the input.

28. The non-transitory computer-readable medium of claim 27, wherein the operations further comprise:
  in accordance with a determination that the file format of the file is compatible with the application, converting the file to a file format corresponding to the application prior to storing content corresponding to the file in the logical file storage location associated with the application.

29. The non-transitory computer-readable medium of claim 28, wherein the converting of the file format of the file to the file format corresponding to the application occurs in response to the file being dropped onto the first user interface element and prior to storing the content corresponding to the file in the logical file storage location.

30. The non-transitory computer-readable medium of claim 27, wherein the operations further comprise:
  in response to determining that the file format of the file is not the compatible file format, returning the content corresponding to the file to its original logical file storage location.

31. The non-transitory computer-readable medium of claim 27, wherein the operations further comprise:
  in accordance with the determination that the file format of the file is compatible with the application, automatically causing the content corresponding to the file to be stored on a remote server, for synchronization with other computing devices that include the application.

32. The non-transitory computer-readable medium of claim 31, wherein the content corresponding to the file is stored on the remote server for synchronization with other computing devices associated with a same user account as the computing device.

33. The non-transitory computer-readable medium of claim 27, wherein the operations further comprise:
  prior to displaying the first user interface element, displaying, on the display, a second user interface element that corresponds to a dock, and detecting a previous input directed toward the second user interface element; and
  wherein the displaying of the first user interface element is in response to the detection of the previous input directed toward the second user interface element.

34. The non-transitory computer-readable medium of claim 33, wherein the previous input directed toward the second user interface element corresponds to a user action directed toward an icon contained within the dock, the icon being associated with the application.

35. The non-transitory machine-readable medium of claim 27, wherein the warning includes text indicating that content corresponding to the file was not stored in the logical file storage location associated with the application because the tile format of the tile is not compatible with the application.

36. The non-transitory machine-readable medium of claim 27, wherein the first user interface element corresponds to a folder that corresponds to the logical file storage location associated with the application.

37. The non-transitory machine-readable medium of claim 27, wherein displaying the warning on the display that indicates that the file format of the file is not compatible with the application includes displaying the warning on the display that indicates that the file format of the file is not compatible with the application concurrently with displaying the plurality of file representations that correspond to the plurality of files that were stored in the logical file storage location prior to detecting the input.

38. The non-transitory machine-readable medium of claim 27, wherein the operations further comprises:
  in response to detecting the input that corresponds to dropping the representation of the file onto the first user interface element, displaying, on the display, a panel with one or more affordances that correspond to one or more computing devices, wherein selection of a respective affordance among the one or more affordances causes the file to be transmitted to a corresponding computing device.

39. The non-transitory computer-readable medium of claim 27, wherein the plurality of files stored in the logical file storage location correspond to one or more file formats that are compatible with the application.

* * * * *